HANDLING MINIATURE SOLID-STATE DEVICES

Filed May 6, 1964

INVENTORS
H.K.Ishler
J.L.Fellin
J.H.Bates
BY Connolly and Hutz
ATTORNEYS

United States Patent Office 3,278,018

Patented Oct. 11, 1966

3,278,018

HANDLING MINIATURE SOLID-STATE DEVICES

Harry Kenneth Ishler, Hopkinton, Joseph Lawrence Fellin, Concord, and John Haywood Bates, Chichester, N.H., assignors to Sprague Electric Company, North Adams, Mass., a corporation of Massachusetts Filed May 6, 1964, Ser. No. 365,268
5 Claims. (Cl. 206—56)

The present invention relates to miniature solid-state devices which are too small to be conveniently shipped or handled, as for example during a testing operation or during installation in a circuit.

The present invention permits ready mechanical and manual handling of solid-state devices ranging from relatively simple diodes and transistors to complex integrated circuits in which a plurality of active and passive components are formed on a single substrate.

Among the objects of the present invention is a novel carrier or handling unit which simplifies shipping, handling, testing and installation of miniature solid-state devices.

The foregoing as well as additional objects of the present invention will be more fully appreciated from the following description of several of its exemplifications, reference being made to the accompanying drawings wherein.

According to the present invention, a handling unit for miniature solid-state devices having projecting flexible leads includes a generally flat frame-shaped support, a first section of the support at its inner edge being readily severable from the remainder and large enough to hold the device, and a second section of the frame substantially opposite the first section having an electrically insulating surface to which leads from the device can be secured and held exposed for testing.

The support is preferably a punched-out portion of metal strip material only a few mils thick. For the purpose of having the tab section carrying the device more readily severable from the balance of the support, a line of weakness, such as a row of spaced perforations or a sharp crease, can be provided between the two. The securing of the device leads to the support is effectively accomplishd, for example, by means of electrically conductive cement.

Figure 1:
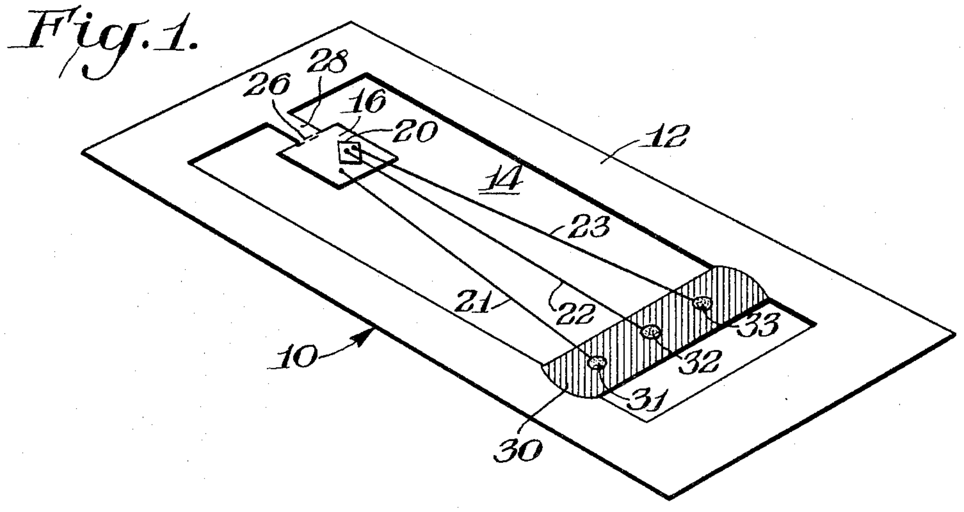
FIGURE 1 is an enlarged perspective view of a carrier or handling unit according to the present invention.

Turning now to the drawings, FIGURE 1 illustrates a handling assembly 10 that includes a metal strip in the general shape of an oblong frame 12 with an open center 14. An integral tab 16 projects inwardly a little from the inner edge of frame 12, and on this tab 16 is held the device 20 which is shown for simplicity as a transistor. The transistor can have one face directly attached to a surface of tab 16, so that the tab itself acts as the collector terminal, for example, and can carry a terminal lead 21 also soldered to tab 16 if desired. The emitter and base connections of the transistor are provided by additional leads 22, 23 connected to the transistor itself by any of the suitable arrangements known to the art.

The three leads 21, 22, 23 extend across the open center 14 and terminate at an electrically insulating surface 30 coated on a bridging section of frame 12 or stretched across the width of supporting frame 12 as a self-sustainong stratum secured to the frame only at its ends. Drops of electrically conductive cement 31, 32, 33 hold the free ends of the leads 21, 22, 23 in place on surface 30. A very effective cement for this purpose is an epoxy resin that has been mixed with powdered gold in the proportion of 0.8 to 1 part by weight of gold for every part by weight of cement. Other resins can be used, however, and other conductive fillers can be incorporated in them. However, the epoxy resin filled with gold is unusually desirable because its conductivity shows very little change on storage and it has considerable adhesiveness for a mixture containing so much filler.

Surface 30 is readily provided by applying to frame 12 a pressure-sensitive tape of polyethylene terephthalate film, or similar material. Ordinarily regenerated cellulose tape can also be used, particularly if the regenerated cellulose is covered with a layer of varnish to reduce variations in its electrical surface conductivity.

Surface 30 can also be in the form of a lacquer coating on a section of frame 12. Epoxy resin cements are particularly desirable for lead anchorages to varnishes inasmuch as such cements are used without solvents and therefore exert very little solvent action on a varnish. Accordingly when the cementing is completed there is no danger of having a short circuit from one drop of cement to another through the varnish coating and metallic frame.

The frame 12 is preferably of a metal on which the solid state device is conveniently mounted. Gold-plated "Kovar," which is an alloy of 20% nickel, 17% cobalt, 0.2% manganese and the balance iron, makes a particularly suitable type of frame; the gold providing a surface to which the soldering of solid-state devices is readily effected, and the "Kovar" provides a relatively rigid supporting material. The gold can be plated on both surfaces of the frame, or at least on both surfaces of tab 16 so that the tab can be directly transferred to the circuit in which the device is to be connected, by soldering the lower surface of the tab in place.

Testing of solid-state devices that are mounted in accordance with this invention is conveniently accomplished by plugging assembly 10 into a test jig that is so constructed and arranged that conductive dots 31, 32, 33 are urged between electrical circuit contacts.

To make the tab 16 easier to separate from the remainder of support 12, a score line 26 is provided between the tab and the balance of the support. Also the tab is connected to the support through a relatively narrow neck 28.

The arrangement illustrated in FIGURE 1 makes a particularly convenient one for shipping, handling, testing, and installing miniature solid-state devices. The miniaturization of such devices has reached such extremes that many of them are commercially made with semiconductor bodies only about 20 x 20 x 5 mil chips. By way of example only, epitaxial planar transistors in this range of sizes are conveniently made by the process described in U.S. Letters Patent 3,122,817 issued March 3, 1964, to J. Andrus.

By mounting a solid-state device on the support of FIGURE 1 it is a relatively simple matter to manually work with the device to carry out those operations required to put the device into use. The support 12 is of such size that it can readily be picked up with tweezers or even fingers, without using anything but the naked eye to guide the handling. The device leads are also kept fixed in place at each of their ends so that they do not become entangled and they are not unnecessarily flexed to the point that they might readily break.

Figure 2:
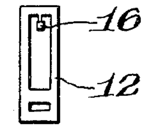
FIGURE 2 is a plan view of the unit of FIGURE 1, shown not enlarged.

The invention will be better appreciated by a reference to FIGURE 2 which shows the actual size of an assembly 10 of the type illustrated in FIGURE 1. It will be noted that the device itself is small enough to fit on tab 16 which itself is so small that it is not conveniently handled even while attempting to guide the handling by looking through an enlarging lens.

Planar transistors are particularly simple to mount on supports of the type described above, inasmuch as such devices can readily be soldered or welded or even cemented to the support tab 16 along one face while an opposing face of the transistor provides sites from which two and sometimes three of its terminal leads project. Individual transistors can be mounted on separate supports 12 as they are manufactured, their leads secured in place as indicated, and then submitted to the routine testing by connecting the test equipment to the bodies of conductive cement 31, 32, 33. Those that test satisfactory can then be installed in the desired circuit by placing the support carrying the device 20 over the location at which the connection is to be made, then soldering, welding or cementing the tab 16 to a circuit support, if desired, and soldering, welding or cementing the leads 21, 22, 23 to the circuit. These connections can be made while the leads are still affixed to stratum 30 as by carrying out soldering operations on portions of the leads that extend across open space 14. The leads can then be cut between the soldered locations and the anchorage stratum 30. Tab 16 can then also be severed along weakened portion 26 from the remainder of support 12, thereby completing the installation.

A plurality of devices can similarly be mounted on a single support, using separate tabs 16 spaced along one side of the frame 12 to hold each device, and corresponding anchorages on the opposite portion of the frame to hold the leads. If desired, a single tab 16 can be used to hold more than one device, or it can hold a device along with other discrete circuit components such as resistors, inductors and capacitors.

Figure 3:
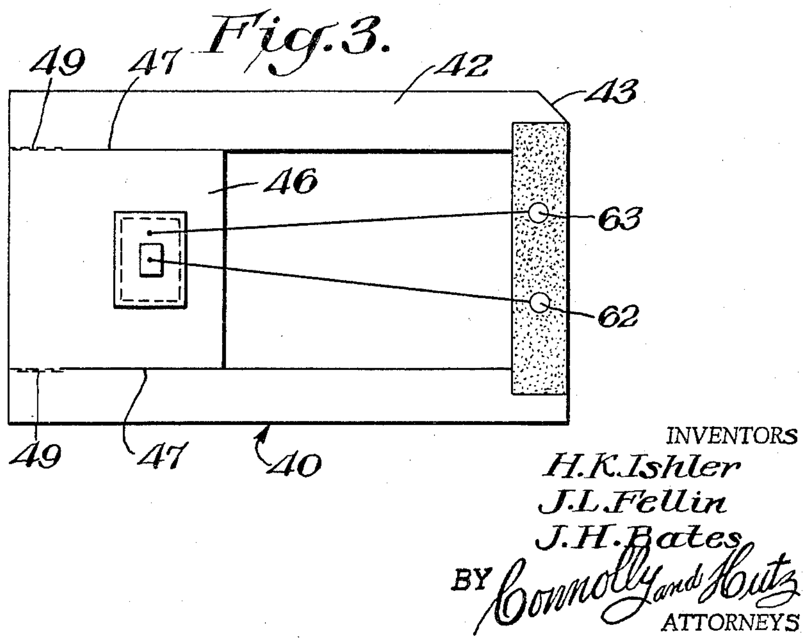
FIGURE 3 is an enlarged plan view of a modified handling unit representative of the present invention.

FIGURE 3 shows a modified form of handling assembly 40 in which the supporting frame 42 can have its periphery shaped as by means of a cut corner 43 so that the support is rendered nonsymmetrical and can be properly oriented. A tab 46 is provided on frame 42 as by merely cutting lines 47 most of the way across a relatively wide portion of the frame, and providing perforated tear lines 49 the remainder of the way across.

The construction of FIGURE 3 is otherwise similar to that of FIGURE 1 except that in FIGURE 3 there is shown a planar-type of transistor for which the tab 46 acts as the collector lead. Its testing is accordingly effected by contacting separate test probes with bodies of cement 62, 63 holding base and emitter leads, and contacting another test probe against frame 42 itself at some convenient location. The orientation of the cut lines 47 and perforation lines 49 are such that the body of the support 42 can be very readily torn away from tab 46 when this becomes necessary, without having the tear tend to run across the tab and endanger the transistor mounting.

Obviously many modifications and variations of the present invention are possible in the light of the above teachings. It is, therefore, to be understood that within the scope of the appended claims the invention may be practiced otherwise than as specifically described.

What is claimed is:

1. A handling unit for miniature solid state devices having a generally flat metallic frame-shaped support having an open interior, said support including as an integral portion a metallic first section of said support at its inner edge having a portion of relative weakness and a tab portion being readily severable, and a second section spaced from said first section by the open interior, a solid state device supported in said handling unit having said tab portion as a permanent element, flexible leads projecting from said solid state device and an electrically non-conductive surface on said second section on which the leads are secured.

2. A handling unit for miniature solid state devices having a generally flat metallic frame-shaped support having an open interior, a solid state device affixed to said support, a metallic first section integral with said support at its inner edge having a portion of relative weakness and a tab portion as a permanent element of said solid state device, said tab portion being readily severable from said support, a second section spaced from said first section by the open interior having an electrically non-conductive surface on said section, flexible lead elements projecting from said device and securing elements securing said lead elements to said non-conductive surface.

3. The combination of claim 2 in which said securing elements are bodies of electrically conductive cement.

4. The combination of claim 2 in which said portion of relative weakness is a line of weakness between said readily severable first section of said support and the balance of said support.

5. The combination of claim 2 in which the solid-state device includes a plurality of terminals one of which is electrically connected to the readily severable first section of said support.

References Cited by the Examiner

UNITED STATES PATENTS

| | | | |
|---|---|---|---|
| 2,911,572 | 11/1959 | Francis et al. | |
| 3,086,652 | 4/1963 | Lipscomb | 206—80 |
| 3,200,942 | 8/1965 | Wagner | 206—46 |

OTHER REFERENCES

Electronics: Productions Techniques, August 1963.

THERON E. CONDON, *Primary Examiner.*

W. T. DIXSON, *Assistant Examiner.*